May 7, 1968 A. H. LAMB 3,381,530
DEVICE FOR INDICATING THE TEMPERATURE
AND VELOCITY OF AN AIR STREAM
Filed Aug. 29, 1966 2 Sheets-Sheet 1
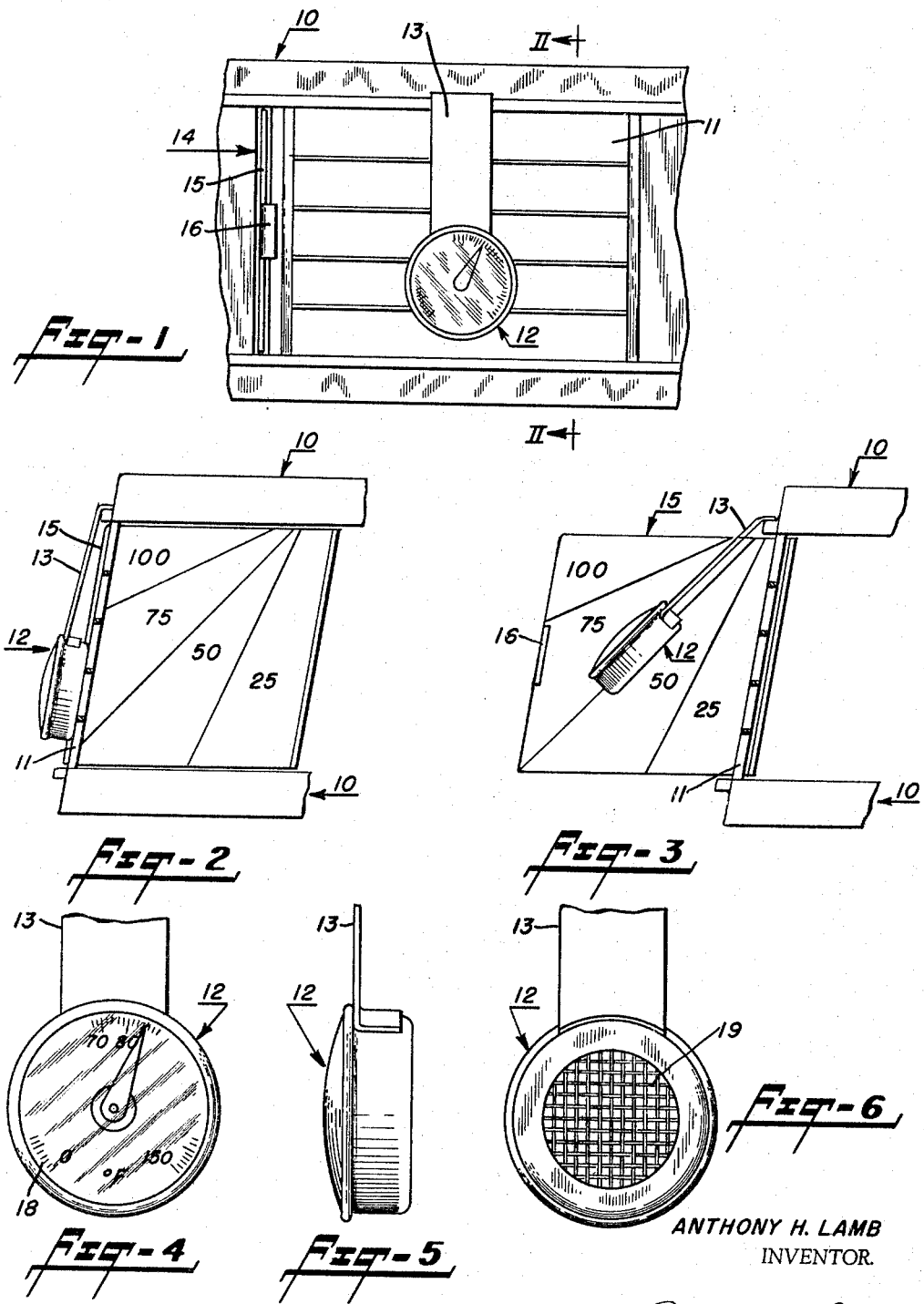
ANTHONY H. LAMB
INVENTOR.

May 7, 1968   A. H. LAMB   3,381,530
DEVICE FOR INDICATING THE TEMPERATURE
AND VELOCITY OF AN AIR STREAM
Filed Aug. 29, 1966   2 Sheets-Sheet 2

ANTHONY H. LAMB
INVENTOR.

BY *Rudolph J. Zwick*
ATTORNEY

United States Patent Office

3,381,530
Patented May 7, 1968

3,381,530
DEVICE FOR INDICATING THE TEMPERATURE
AND VELOCITY OF AN AIR STREAM
Anthony H. Lamb, 66 King St.,
Hillside, N.J. 07205
Filed Aug. 29, 1966, Ser. No. 575,685
6 Claims. (Cl. 73—198)

This invention relates to a device for indicating the temperature and velocity of an air stream.

A device made in accordance with this invention is adaptable for use in numerous applications wherein it is desired to provide an indication of the velocity and temperature of a moving air stream but it will be described specifically with reference to a car air conditioner.

Unlike home-type window units, car air conditioners are not sealed since they operate from a pulley driven by the car engine. Thus, in addition to the usual troubles, a serious problem associated with a car unit is the loss of cooling gas. In order to maintain the gaskets in as good a condition as possible, the manufacturer's instructions require the owner to operate the unit frequently during the winter season, for example, for five minutes every two weeks. Many owners ignore this requirement and when summer arrives find that the air conditioner does not operate as expected. The improper operation of the unit may be due to loss of the cooling gas and/or to a reduced air flow due to frosting, cracked or leaky air ducts, sticky fan, etc. Often, questions arise as to whether the unit is operating normally, that is, delivering air at a proper temperature and velocity. At present, there is not available a simple and suitable device for testing the air conditioner to determine whether it is operating in accordance with the manufacturer's specifications.

An object of this invention is the provision of a device for indicating the temperature and velocity of an air stream.

An object of this invention is the provision of a device comprising a temperature indicator, flexible means for suspending the indicator in a position to be displaced by an air stream, and a scale for indicating displacement of the thermometer in terms of air velocity.

An object of this invention is the provision of a device for indicating the output of an air conditioner comprising a thermometer having a scale calibrated in temperature values, means for positioning the thermometer in front of an outlet opening of the air conditioner while affording displacement of the thermometer in correspondence with the velocity of the air passing out of the outlet opening, and a second scale associated with the thermometer and calibrated in factors of air velocity.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a fragmentary, front elevational view showing a device made in accordance with this invention and attached to the dashboard of an automobile;

FIGURE 2 is a fragmentary cross-sectional view taken along the line II—II of FIGURE 1;

FIGURE 3 is a similar view but showing the scale plate in the fully-extended position;

FIGURE 4 is an enlarged, front elevational view of the thermometer;

FIGURES 5 and 6 are, respectively, side and rear elevational views thereof; and

Figure 7:
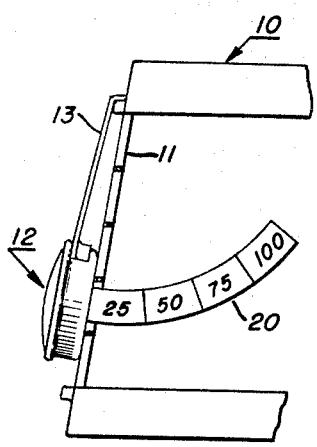
Figure 8:
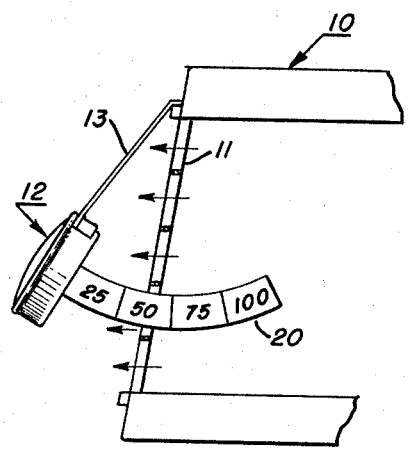

FIGURES 7 and 8 correspond generally to FIGURES 2 and 3 and show another embodiment of the invention.

Reference now is made to FIGURES 1–3 wherein there is shown a portion of an automobile dashboard 10 provided with a grill 11 disposed in front of an outlet duct of the air conditioning unit. A small, bi-metallic thermometer 12 has secured thereto a flexible strap 13. The strap may be made of a textile tape, plastic or thin metal and has its upper end secured to the dashboard. On certain dashboards, having a trimming strip extending along the upper end of the grill, the strap preferably is made of a thin metal and the free end thereof is curled over and hooked behind the trimming strip. Otherwise, the end of the strap may be secured to the dashboard by cement or by a small piece of adhesive tape. In any event, the thermometer is suspended over the grill and is movable away from the grill to an extent depending upon the velocity of the air coming out of the grill.

Slidably disposed within a vertical slot 14, formed in the dashboard, is a metal, or plastic, plate 15, provided with an offset pull tab 16. The surface of the plate facing the thermometer has formed thereon a scale calibrated in terms of air velocity. Normally, the plate is in the retracted position shown in FIGURES 1 and 2. When it is desired to check the air velocity, the plate is withdrawn to the position shown in FIGURE 3, whereby the displacement of the thermometer can be noted with reference to the scale. As shown in FIGURE 3, the velocity of the air passing through the grill is 50% of full volume.

As shown in FIGURES 4–6, the thermometer 12 has a pointer rotatable along a scale 18 calibrated in temperature values over a range of, say, 0 to 150° F. In some cars, the air conditioning unit serves as a heater as well as an air cooler. By providing an extended temperature range on the thermometer, it serves also to indicate the temperature of the air passing out of the grill when the unit is used as an air heater. The thermometer pointer is attached to one end of a rapid response bi-metallic coil disposed within a cup-like case. As shown in FIGURE 6, the rear of the case is provided with a relatively large opening spanned by a screen 19. Thus, the pointer responds quickly to temperature changes, and the entire thermometer responds quickly to changes in the air flow.

The manufacturers of car air conditioners provide exact temperature outlet values for all degrees of outside temperature and humidity. The described device provides air temperature and velocity readings which can be checked with the manufacturer's specifications to determine how well the unit is performing.

In most cars which have a factory installed air conditioner, there is a central outlet provided on the instrument panel. The flow of air from such outlet can be turned on or off but it cannot be deflected. The result is that the air blast strikes the driver's chest, neck and right arm, which often is uncomfortable, especially if the driver enters the car overheated or sweating. The extended scale plate 15, as shown in FIGURE 3, also serves to deflect the air stream away from the driver. Thus, under this condition, the flow of cold air need not be shut off, thereby resulting in a quicker cooling of the car interior.

In the embodiment of the invention shown in FIGURES 7 and 8, an arcuate scale plate 20 is attached to the thermometer case and extends through an opening of the grill 11. This plate carries the scale of air velocity values. Displacement of the thermometer, by the air escaping from the grill, as shown in FIGURE 8, exposes to view a corresponding portion of scale. As shown, the air has a velocity of 50% of full volume. In this embodiment, the thermometer and air velocity scale comprise a unitary, portable device. Such device may be installed permanently or temporarily on the car. Alternatively, such device may be used to check a conventional window-type home air conditioning unit, either in the store prior to purchase thereof, or periodically after the unit has been installed. The device may also be used to check console type air conditioners, room outlets in central cooling and heating units, and units such as are used in aircraft, railroad cars, buses, subways, etc.

Having now described the invention, those skilled in this art will be able to make various changes without thereby departing from the spirit and scope of the invention as defined in the following claims.

I claim:
1. A device for indicating the temperature and velocity of an air stream comprising,
   (a) a temperature-sensitive member having a scale calibrated in temperature values,
   (b) flexible means suspending the said member in front of a grill for pivotal displacement in correspondence with the velocity of air passing out of the grill, and
   (c) indicating means including the said member for indicating the pivotal displacement of the member in terms of air velocity.
2. The invention as recited in claim 1, wherein the temperature-sensitive member is a thermometer housed in a cuplike case having an open bottom and wherein the thermometer is suspended with the open bottom facing upstream of the air stream.
3. The invention as recited in claim 2, wherein the said indicating means comprises a plate carrying a scale calibrated in terms of air velocity, said plate being spaced from the thermometer and lying in a plane substantially normal to that containing the thermometer case.
4. The invention as recited in claim 2, wherein the said indicating means comprises an arcuate plate secured to the thermometer and movable in an opening of the grill, said plate carrying a scale of air velocity values.
5. A device for indicating the temperature and velocity of air passing through a grill comprising,
   (a) a thermometer having a pointer movable along a scale of temperature values, said thermometer being housed in a cuplike case having an open bottom,
   (b) a flexible strap having one end secured to the thermometer case,
   (c) means for securing the other end of the strap in fixed position relative to the grill, thereby to suspend the thermometer in front of the grill with the open bottom of the case facing the grill,
   (d) a plate carrying a scale calibrated in terms of air velocity, and
   (e) means mounting the said plate for sliding movement relative to the grill and in a plane substantially normal to that containing the thermometer case, the arrangement being such that the thermometer continuously indicates the temperature of the air passing through the grill and the displacement of the thermometer relative to said plate provides an indication of the velocity of the air passing through the grill.
6. A device for indicating the temperature and velocity of air passing through a grill comprising,
   (a) a thermometer having a pointer movable along a scale of temperature values, said thermometer being housed in a cuplike case having an open bottom,
   (b) a flexible strap having one end secured to the thermometer case,
   (c) means for securing the other end of the strap in fixed position relative to the grill, thereby to suspend the thermometer in front of the grill with the open bottom of the case facing the grill, and
   (d) a plate secured to the thermometer case and extending through an opening of the grill, said plate carrying a scale calibrated in terms of air velocity, the arrangement being such that the thermometer continuously indicates the temperature of the air passing through the grill and the displacement of the said plate relative to the grill provides an indication of the velocity of the air passing through the grill.

References Cited
UNITED STATES PATENTS

| | | | |
|---|---|---|---|
| 2,700,899 | 2/1955 | Myers | 73—228 |
| 2,806,377 | 9/1957 | Herman | 73—228 X |
| 3,287,973 | 11/1966 | Liebermann et al. | 73—228 |

OTHER REFERENCES

"Flowtronic Air Velocity Meter," Bulletin 64, Flow Corporation, Cambridge, Mass.

RICHARD C. QUEISSER, *Primary Examiner.*

JAMES GILL, *Examiner.*

EDWARD D. GILHOOLY, *Assistant Examiner.*